United States Patent
Nielsen (10) Patent No.: US 11,085,419 B2
(45) Date of Patent: Aug. 10, 2021

(54) CONTROL OF A WIND ENERGY PARK COMPRISING AIRBORNE WIND ENERGY

(71) Applicant: Vestas Wind Systems A/S, Aarhus N. (DK)

(72) Inventor: Thomas S. Bjertrup Nielsen, Randers SV (DK)

(73) Assignee: Vestas Wind Systems A/S, Aarhus N. (DK)

(*) Notice: Subject to any disclaimer, the term of this patent is extended or adjusted under 35 U.S.C. 154(b) by 0 days.

(21) Appl. No.: 16/771,847

(22) PCT Filed: Dec. 20, 2018

(86) PCT No.: PCT/DK2018/050416
§ 371 (c)(1),
(2) Date: Jun. 11, 2020

(87) PCT Pub. No.: WO2019/120457
PCT Pub. Date: Jun. 27, 2019

(65) Prior Publication Data
US 2021/0172422 A1    Jun. 10, 2021

(30) Foreign Application Priority Data
Dec. 22, 2017    (DK) .................. PA 2017 71009

(51) Int. Cl.
*F03D 9/00* (2016.01)
*H02P 9/04* (2006.01)
(Continued)

(52) U.S. Cl.
CPC ............ *F03D 7/048* (2013.01); *F03D 9/257* (2017.02); *F05B 2240/921* (2013.01); *F05B 2270/321* (2013.01)

(58) Field of Classification Search
CPC .... F03D 7/048; F03D 9/257; F05B 2240/921; F05B 2270/321
See application file for complete search history.

(56) References Cited

U.S. PATENT DOCUMENTS 9,767,700 B1     9/2017 Vander Lind
2007/0176432 A1* 8/2007 Rolt .................... H01R 13/713
                                                290/55

(Continued)

FOREIGN PATENT DOCUMENTS

WO    2009016020 A1    2/2009

OTHER PUBLICATIONS

Danish Patent and Trademark Office, Search and Examination Report in PA 2017 71009, dated May 25, 2018.
(Continued)

*Primary Examiner* — Tulsidas G Patel
*Assistant Examiner* — Thomas K Quigley
(74) *Attorney, Agent, or Firm* — Wood Herron & Evans LLP (57) ABSTRACT

The invention relates to a method for controlling the operation of a number of airborne wind energy systems arranged in a wind energy park, where each airborne wind energy system comprising a wind engaging member being coupled to a ground station via a cable. The method comprises the determination of an operational parameter of each of the airborne wind energy systems, such as the flight trajectory, the cable tension, or the power production. A first airborne wind energy system is controlled according to a fault control mode if its operational parameter deviates more than a predetermined threshold parameter from the operation parameters of the other airborne wind energy system. The (Continued)

method further comprises operating one or more neighbouring airborne wind energy systems according to a safe control mode.

18 Claims, 8 Drawing Sheets

(51) Int. Cl.
*F03D 7/04* (2006.01)
*F03D 9/25* (2016.01)

(56) References Cited

U.S. PATENT DOCUMENTS

| 2015/0097086 A1 | 4/2015 | Schaefer |
| 2017/0363066 A1 | 12/2017 | Hart et al. |
| 2021/0033069 A1* | 2/2021 | Lindholm ............... B64C 31/06 |

OTHER PUBLICATIONS

European Patent Office, International Search Report and Written Opinion in PCT Application No. PCT/DK2018/050416, dated Mar. 20, 2019.

Antonello Cherubini et al., Airborne Wind Energy Systems: A review of the technologies, Renewable and Sustainable Energy Reviews, 51 (2015) 1461-1476.

\* cited by examiner

CONTROL OF A WIND ENERGY PARK COMPRISING AIRBORNE WIND ENERGY

FIELD OF THE INVENTION

The present invention relates to a method for controlling the operation of a number of airborne wind energy systems arranged in a wind energy park and where the airborne wind energy systems comprise a wind engaging member being coupled to a ground station via a cable.

BACKGROUND OF THE INVENTION

Various airborne wind energy systems, being capable of capturing wind energy at a higher altitude than traditional wind turbines, are known. Common to these systems is that a part of the system is launched to a high altitude, where energy of the wind is harvested. The harvested energy is transferred to a ground station, either in the form of mechanical energy or in the form of electrical energy. In the case that the transferred energy is in the form of mechanical energy, a generator will normally be arranged at the ground station in order to convert the mechanical energy into electrical energy. In the case that the transferred energy is in the form of electrical energy, the airborne wind energy system comprises an airborne generator, i.e. the part of the system which is launched to a high altitude includes a generator. The wind engaging part of the airborne wind energy system being launched to a high altitude may, e.g., include a kite or a glider.

A number of airborne wind energy systems are described in Cherubini, et al., 'Airborne Wind Energy Systems: A review of the technologies', Renewable and Sustainable Energy Reviews, 51 (2015) 1461-1476.

Two or more airborne wind energy system can with benefits be placed in wind energy parks both onshore and offshore, meaning that more than one airborne wind energy system can be in operation at the same time and with a ground/sea level unit placed relative close together within a specific site area.

DESCRIPTION OF THE INVENTION

It is an object of embodiments of the invention to provide a method of controlling a number of airborne wind energy systems in a wind energy park wherein information on the operation of all the airborne wind energy systems is used to improve the operation of each of the airborne wind energy systems in the park.

It is a further object of embodiments of the invention to provide a method of controlling a number of airborne wind energy systems in a wind energy park with a view to obtain a high power output yet still with a reduced risk of collisions or uncontrolled events between the wind engaging members flying at different positions and heights.

According to a first aspect the invention relates to a method for controlling the operation of a number of airborne wind energy systems arranged in a wind energy park, each airborne wind energy system comprising a wind engaging member being coupled to a ground station via a cable. The method comprises:

determining an operational parameter of each of the number of airborne wind energy systems, determining a deviation between the operation parameter of a first airborne wind energy system and the operational parameters of the other airborne wind energy systems, controlling the operation of the first airborne wind energy system according to a normal control mode if the deviation is smaller than a predetermined threshold parameter, and controlling the operation of the first airborne wind energy system according to a fault control mode if the deviation is larger than or equal to the predetermined threshold parameter.

The airborne wind energy systems together form a wind energy park. Each of the airborne wind energy systems controlled by the method according to the invention comprises a wind engaging member such as a kite or a glider or even more kites in a kite train. The wind engaging member is coupled to a ground station via a cable. Accordingly, the airborne wind energy system is mechanically attached to the ground station by means of the cable. According to the method, one or more operational parameters of each airborne wind energy system are determined and compared. The operational parameter may be measured directly or indirectly by sensors on different parts of the airborne wind energy system, or alternatively or additionally derived. The operational parameter may be a parameter characterizing the performance or the flight characteristics of the airborne wind energy system at a given time or over a time period or time interval such some predetermined time period, over the time of a power production phase and/or a recovery phase i.e. over a part of or an entire flight cycle. The operational parameter may for example comprise one of power production, flight position, flight speed, a tension in the cable, a cable extraction and/or retraction speed, and an angle of the cable.

Particularly, the operational parameters may be parameters being independent on GPS position measurements. Accordingly, the operational parameters may exclude flight position, but include any one or more of power production, a tension in the cable, a cable extraction and/or retraction speed, an angle of the cable and a winding direction. Accordingly, operation may become robust and tolerate errors in the GPS system.

At least one of the speed and the position could be determined by determining a position of a point on the cable. The point could be where the cable is connected to the first airborne wind energy system or at least in the vicinity of the first airborne wind energy system.

The performance of a first airborne wind energy system is compared to the performance of the others by determining a deviation between the operation parameter of the first airborne wind energy system and the operational parameters of the other airborne wind energy systems. Depending on the size of the deviation, the first airborne wind energy system is then operated according to a normal control mode or to a fault control mode. If the performance or flight characteristics of the first airborne wind energy system deviates more than pre-set threshold from the other airborne wind energy system, the first airborne wind energy system is most likely faulty or malfunctioning in some aspect and is therefore advantageously operated accordingly. The deviating behaviour may for example be caused by a worn or otherwise non-optimally working component, by a jammed or malfunctioning winch system, a broken steering line to the kite, non-optimal operation of a propeller on a glider etc. In this way, information from the other airborne wind energy systems in the same park and therefore under presumably near identical or closely resembling operational conditions is gathered and used to determine if one of the airborne wind energy systems performs or flies differently. Hereby, a malfunctioning or non-optimal operation of any one of the airborne wind energy systems in the wind energy park may readily and effectively be identified and consequently acted upon much faster than as determined traditionally based only on information on its own performance. This may be used to operate the faulty airborne wind energy system in a more suitable, effective or safe manner, which may act to improve the performance of the airborne wind energy system, act to prevent a fault or error to worsen, and/or act to prevent more severe damage to itself or to one or more of the other airborne wind energy systems in the wind energy park such a collision.

The deviation may comprise determining the difference between the operational parameter of the first airborne wind energy system and the average or mean operational parameter of the other airborne wind energy systems. In an embodiment, the deviation is determined as the difference between the operational parameter of the first airborne wind energy systems and a weighted average of the operational parameters of the other airborne wind energy systems.

If the wind energy park comprises more airborne wind energy systems of different types or operated at different height levels or otherwise being different, the comparison of the airborne wind energy systems according to the method is advantageously performed between airborne wind energy systems of the same, similar, or comparable types. Alternatively or additionally, the airborne wind energy systems are compared based on an operational parameter which would be comparable between the different airborne wind energy systems if all operating and behaving normally. Different sizes, models etc may in an embodiment be taken into account by the application of individual weight factors to the operational parameter of each airborne wind energy system when compared.

Different predetermined threshold parameters may be set for different operational parameters being determined. A threshold parameter may as an example be pre-set to allow a power production variation of 10% or 15% between a first airborne wind energy system and the average of the other airborne wind energy systems. Similarly, a deviation of 5% may be allowed when comparing the maximal tension in the cable during a flight cycle. These numbers are purely for exemplary purpose and are advantageously set and regulated based on measurements on airborne wind energy systems in a wind energy park.

In an embodiment of the invention, the control method further comprises determining the wind direction and controlling the operation of one or more of airborne wind energy systems in a downwind direction to the first airborne wind energy system according to a safe control mode if the first airborne wind energy system is in a fault control mode. Hereby, not only the faulty first airborne wind energy system but also the one or more airborne wind energy systems in a downwind direction may be operated more effectively upon having identified a malfunctioning or differently behaving airborne wind energy system. In this way the risk of a collision or interference between the first airborne wind energy system which has been identified as operating differently than expected and its neighbouring airborne wind energy systems in the downwind direction may be removed or at least considerably reduced.

The wind direction may be determined at some specific height above the ground or may alternatively or additionally be determined at the height at or near the wind engaging member of one or more, or of each of the airborne wind energy systems to be operated according to a fault or a safe control mode. In this way any changes in a wind direction at different heights may be taken into account.

The safe control mode may for example comprise retracting the wind engaging member, steering the wind engaging member in a direction away from the wind engaging member of the first airborne wind energy system, or to a higher height, or in general in some way clearing the airspace for the first airborne wind energy system and thereby ensuring that the wind engaging members and cables are kept away from each other.

In an embodiment, the control method comprises controlling the operation of all neighbouring airborne wind energy systems to the first airborne wind energy system according to a safe control mode if the first airborne wind energy system is in a fault control mode. Hereby the wind direction need not be determined or taken into account to determine which airborne wind energy systems to operate in a safe control mode and to prevent or at least reduce the risk of a collision or interference with the faulty first airborne wind energy system.

As also mentioned in the previous, the operational parameter may comprise one of power production, flight position, flight speed, a tension in the cable, a cable extraction and/or retraction speed, and an angle of the cable. In an embodiment, the operation parameter is determined over a predetermined time or time interval. All these different types of operational parameters can be used to determine whether one airborne wind energy system behaves or operates significantly different to other airborne wind energy system although placed in the same wind energy park and presumably being exposed to the same or similar environmental conditions.

The power production is advantageous in being readily at hand as a measured parameter of any power generating unit. The power production further reflects any malfunctioning or less optimal behaviour of the airborne wind energy system directly. The power production may for example be determined over one or more power production phases and/or recovery phases of each airborne wind energy system such as for each complete flight cycle. Alternatively or additionally, the power production may be determined over some time interval or may be determined at some predetermined height positions of the wind engaging member.

The flight position may be determined as a position of the wind engaging member relative to the ground unit or some other fixed reference position. The flight position and/or the flight speed may be determined at one or more predefined heights and/or at the maximum and/or minimum heights in the flight cycle. These operational parameters advantageously directly show any non-optimal steering of the wind engaging member, any wear or damage in the winch system or in the operating of any steering lines, or any wear or holes or other damage to the wind engaging member or components thereof.

The operational parameter comprising a tension in the cable, a cable extraction and/or retraction speed, and/or an angle of the cable is similarly advantageous both in being readily measurable and in immediately changing is any errors occur in relation to the operation of the cable (for example in the winch system) or if the wind engaging member changes its flight trajectory significantly. Particularly, since the above parameters are derivable from measurements on the cable, they can be determined without GPS connection.

In an embodiment, the fault control mode comprises retracting the wind engaging member to the ground station of the airborne wind energy system or to a lower height. Hereby the faulty or malfunctioning airborne wind energy system is simply and fast retracted to a safe position removing or reducing the risk of any collisions or interference to any of the other airborne wind energy systems while at the same time bringing the faulty first airborne wind energy system down for inspection and potentially repair, maintenance, or update. Further, any potential worsening of the condition of the airborne wind energy system is avoided which in a worst case could lead to a crash of the kite or glider.

In an embodiment, the fault control mode comprises releasing the wind engaging member from the cable between the wind engaging member and the ground station. Hereby the wind engaging member may be allowed and operated to glide or drift towards the ground with the wind. Hereby a potential entanglement or a potential crashing of the wind engaging member may be avoided with the safety risks to any persons or equipment on the ground.

In a further embodiment, the fault control mode further comprises steering the wind engaging member to the ground. The wind engaging member may be of the type of a kite connected to a control unit or control pod via steering lines, and the fault mode may then comprise operating the steering lines and the kite similarly as a paraglider to safely land on the ground. Hereby the control unit and its information may be saved and re-used. Alternatively or additionally, the part of the airborne wind energy system being cut loose may comprise safety systems such as a parachute, an airbag, propellers or the like to aid in a safe steering of the wind engaging member to the ground.

Additionally or alternatively, the fault control mode comprises sending out warning and/or tracking signals from the wind engaging member, the warning and/or tracking signals comprising any of audio, visual, and radio signals. Hereby any persons in the vicinity may be warned of the malfunctioning airborne wind energy system which is especially advantageous if the wind engaging member is releases and falling or gliding to the ground. Further, the signaling is advantageous in finding and retrieving the wind engaging member.

In an embodiment, the fault control mode includes sending a request for service. Hereby the malfunctioning airborne wind energy system may be quickly inspected and repaired. This is further advantageous if the malfunctioning is less severe and there is no or minimal risk in letting the airborne wind energy system continue to generate power. The request for service may also be performed in addition to or at the same time as any of the other steps in a fault control mode described above or in the below.

In yet a further embodiment, the fault control mode comprises maintaining the wind engaging member at essentially the same height and operating the airborne wind energy system in a no-power production mode. This may be advantageous if the first airborne wind energy system can be inspected or repaired without retracting the wind engaging member completely the ground station. In this way the first airborne wind energy system may be faster back in normal operation again.

According to an embodiment of the invention, the safe control mode comprises retracting the wind engaging member to the ground station of the airborne wind energy system, steering the wind engaging member in a direction away from the wind engaging member of the first airborne wind energy system, and/or steering the wind engaging member to a height above the height of the wind engaging member of the first airborne wind energy system. Hereby the wind engaging member of the one or more airborne wind energy systems being operated in the safe control mode is directed away from the airspace where the faulty first airborne wind energy system is or is nearby. Further, in this way an entire belt or passage in the air may be cleared. This will allow for the wind engaging member of the first airborne wind energy system to be safely cut loose of the cable and allowed to fall or glide to the ground without any risk of collision or entanglement.

In an embodiment the safe control mode is initiated prior to initiating the fault control mode. This will advantageously allow for an airspace to be cleared before any controlled taking down of the faulty first airborne wind energy system.

BRIEF DESCRIPTION OF THE DRAWINGS

The invention will now be described in further detail with reference to the accompanying drawings in which.

DETAILED DESCRIPTION OF THE DRAWINGS

Figure 1:
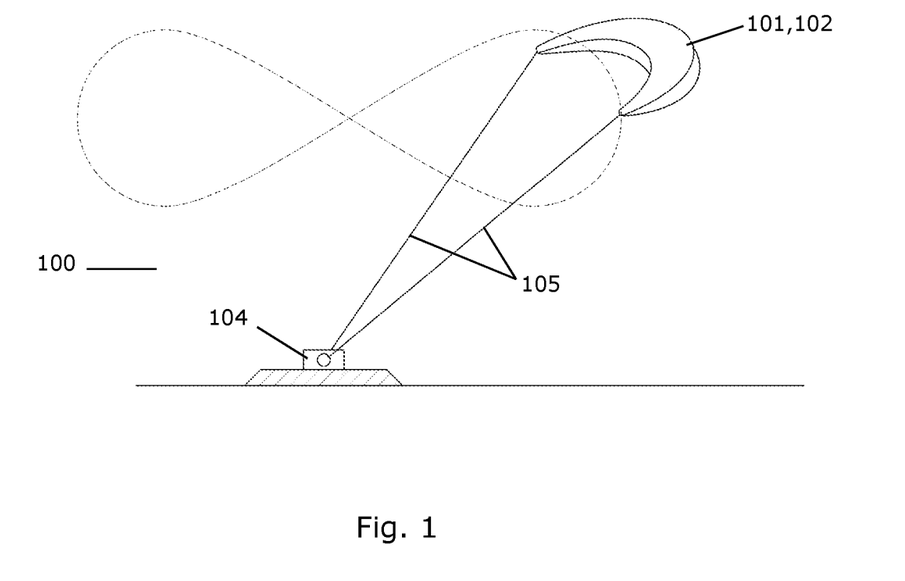
FIGS. 1-2 and 4 are perspective views of three airborne wind energy systems for use in a wind energy park according to an embodiment of the invention.
Figure 2:
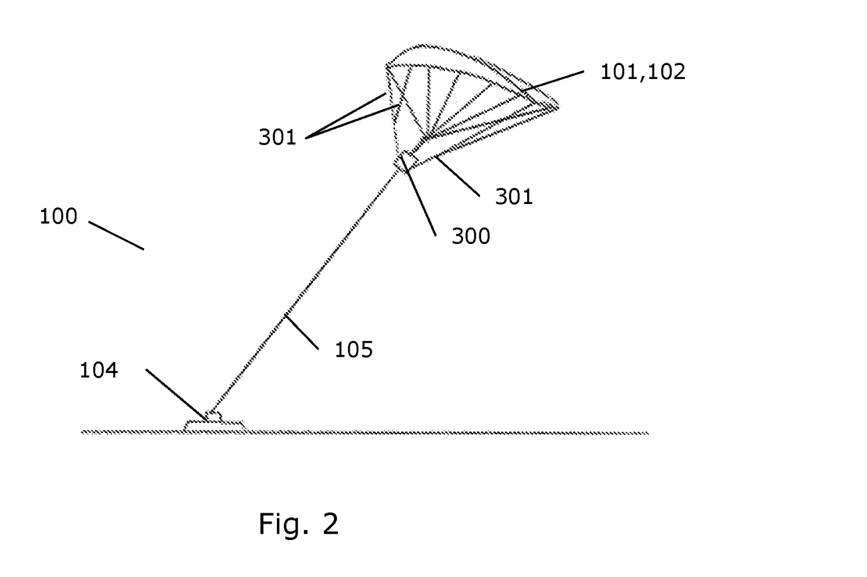
Figure 5:
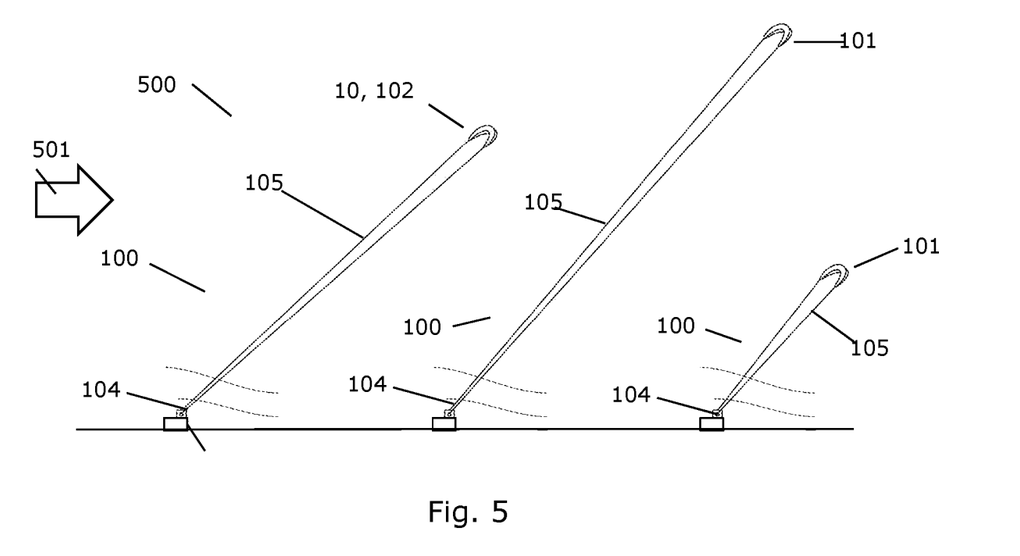
FIGS. 5-7 illustrate a wind energy park with a number of airborne wind energy systems according to embodiments of the invention.

FIGS. 1, 2, and 5 are perspective views of three airborne wind energy systems 100 for use in a wind energy park operated according to embodiments of the invention. The airborne wind energy systems 100 all comprise a wind engaging member 101 catching and moved by the wind and connected to a ground station 103 via one or more cables 105.

In the airborne wind energy system 100 of FIG. 1, the wind engaging member 101 is in the form of a kite 102 connected to a winch system (not shown) in the ground station 103 via two cables 105. The operation of the kite 102 can thereby be fully or partly controlled by operation of the cables and the winch system.

In the airborne wind energy system 100 of FIG. 2, the wind engaging member 101 is also in the form of a kite 102. In this system, the kite is connected to a control unit 300 via steering lines 301 and to a winch system (not shown) in the ground station 103 via a cable 105. The operation of the kite 102 can thereby be fully or partly controlled by the operation of the steering lines 301 by the control unit in addition to the extraction and retraction of the cable 105 controlled from the winch system.

For both airborne wind energy systems of FIGS. 1 and 2, the extraction of the one or more cables 105 from the winch system generates mechanical energy which is transferred via the winch system to a generator positioned on the ground station 104. The generator is in turn electrically coupled to a power transmission line and to a power grid and/or power storage optionally via a converter and/or transformer.

Figures 3A, 3B:
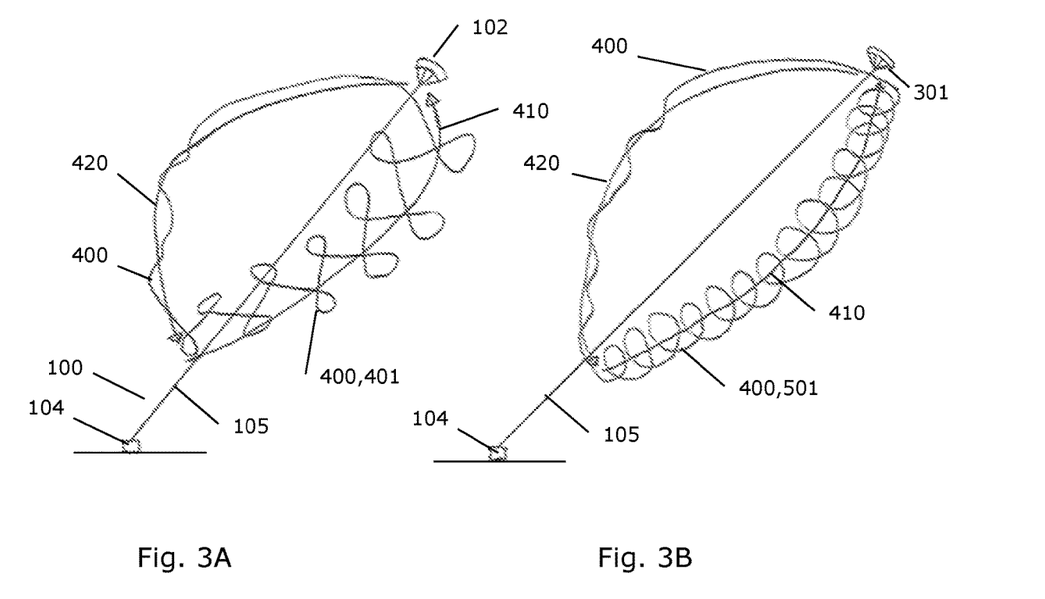
FIGS. 3A and 3B illustrate the power generation phase and the recovery phase of an airborne wind energy system according to embodiments of the invention.

FIGS. 3A and B illustrate the operation of the kite 102 and with typical flight trajectories 400 indicated. Typically, the kite operation comprises a power generation phase of upwards movement 410 of the kite where the kite 102 may extract the cable(s) 105. Here, the wind acting on the kite 102 and the tensioning forces in the cable(s) 105 and any steering lines 301 causes it to move along a flight trajectory having the shape of an upwards spinning figure eight 401 or circle 501. Such typical flight path during power generation is also indicated in FIG. 1 by the dotted line. Subsequently, the kite 102 is retracted while moving along a substantially linear path 420. During this recovery phase wherein the kite 102 is retracted, energy may be consumed. However, the energy consumed is expected to be less than the energy being generated during the upwards spinning movement of the kite 102. Upon reaching a minimum height, the kite is operated to enter a new power generation phase. Typically, the kite 102 may be extracted by the wind to a maximum height in the range of 600-1000 m depending on the type of kite, and is retracted to a minimum height in the range of 50-150 m. Typically, the recovery phase takes up in the order of 10-30% of the time of a total cycle of a power generation phase followed by a recovery phase.

Figure 4:
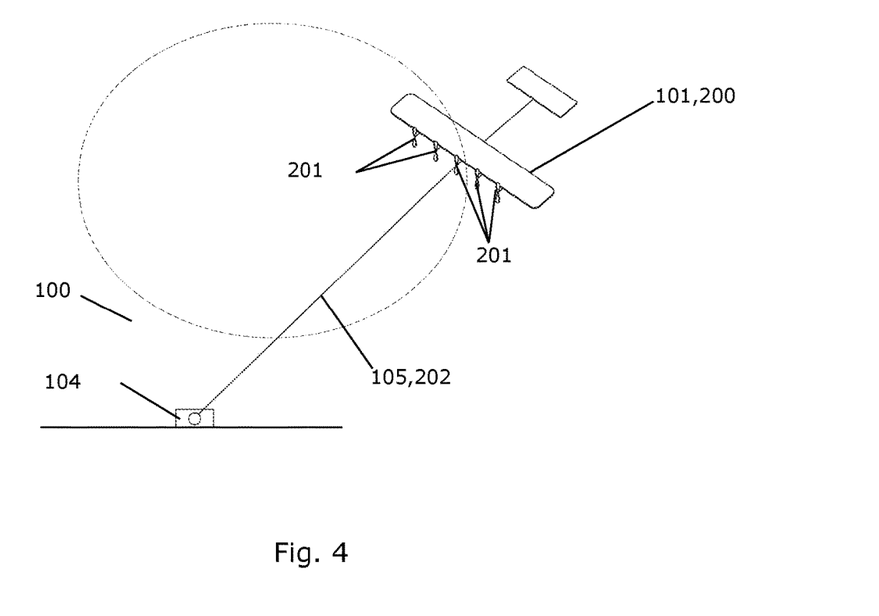

In the airborne wind energy system 100 of FIG. 4, the wind engaging member 101 is in the form of a glider 200, also sometimes referred to as a Makani. The glider 200 is provided with a number of rotors 201, each being capable of extracting energy from the wind and generating electrical energy. The glider 200 is connected to the ground by means of one or more cables 105. FIG. 4 further illustrates the operation of the glider 200. It can be seen that the wind acts on the glider 200 and causes it to move along a substantially circular movement pattern, as indicated by the dotted line. This movement of the glider 200 causes rotation of the rotors 201 and thereby electrical energy is generated.

The electrical energy is transferred to a suitable electrical component, e.g. a transformer or a converter unit, arranged at the ground station 104 via the cable 105 which comprises an electrically conductive cable 202.

Figure 6:
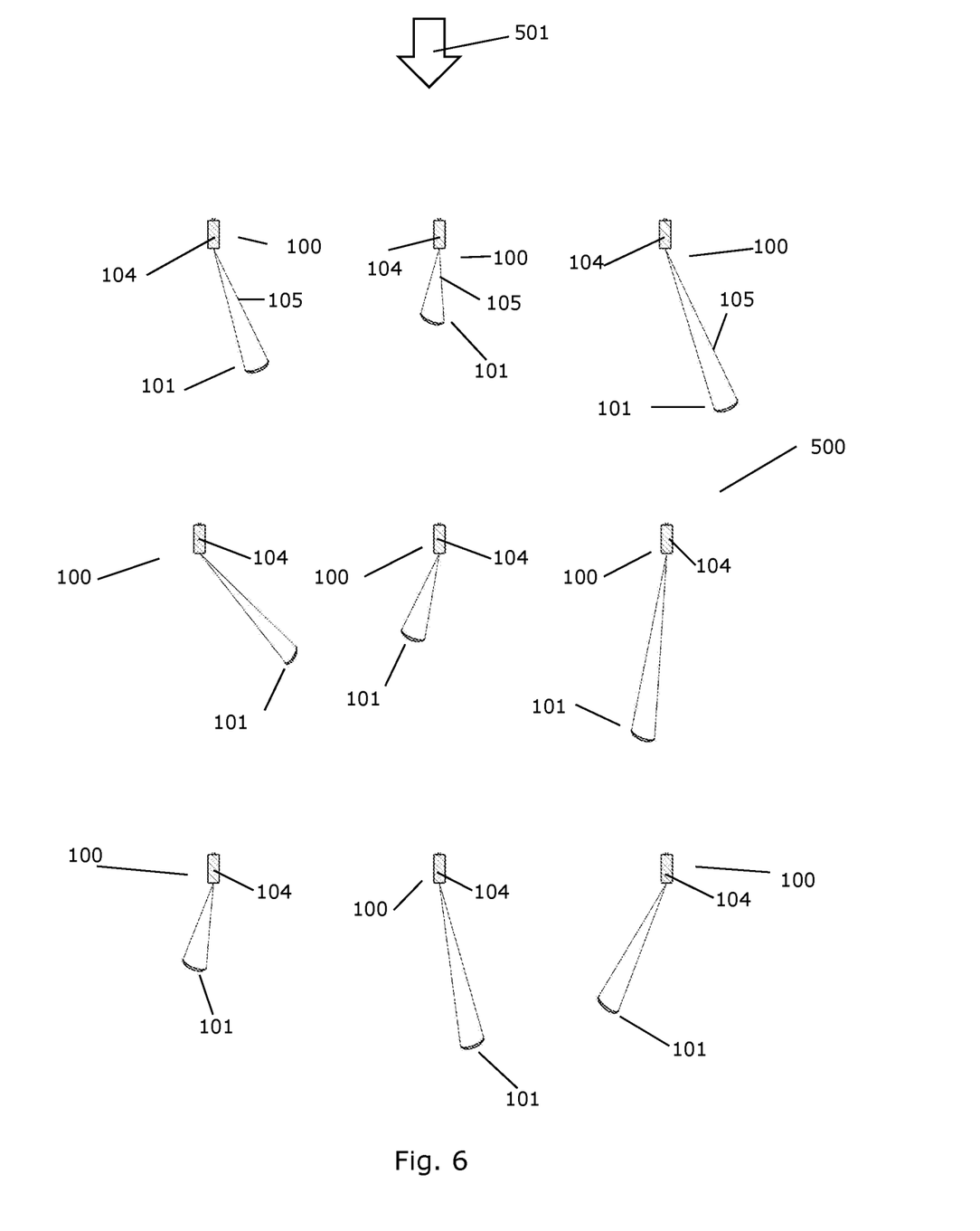

FIGS. 5 and 6 illustrate operation of airborne wind energy systems 100 in a wind energy park 500 according to an embodiment of the invention and as seen from a side and in a top view, respectively. A number of airborne wind energy systems 100 are shown in the figures, each comprising a wind engaging member 101 connected to ground stations 104 via cables 105. The wind engaging members are here shown as all being kites 102 of the same type. However, in an embodiment, an energy park may be equipped with different types of airborne wind energy systems such as for example a kite next to a glider, all gliders 200 etc. The airborne wind energy systems 100 may be directly or indirectly connected optionally via one or more central control units (not shown) which in part or completely contribute to the controlling of the airborne wind energy systems.

The kites or gliders 101 are able to move along specified movement paths or flight trajectories generating mechanical energy, e.g. as described above with reference to FIGS. 3AB and 4.

It can be seen that the kites or gliders 101 are in different positions along their movement patterns or flight trajectories and thereby need not stand precisely in the wind direction (indicated by the arrow 501). Thus, the kites and/or gliders 101 need not to operate in a synchronous manner. It should also be noted that the direction of the wind at the positions of the wind engaging members 101 may be the same or may vary for one reason because of the height variations between the kites and/or gliders at a specific time.

Figure 7:
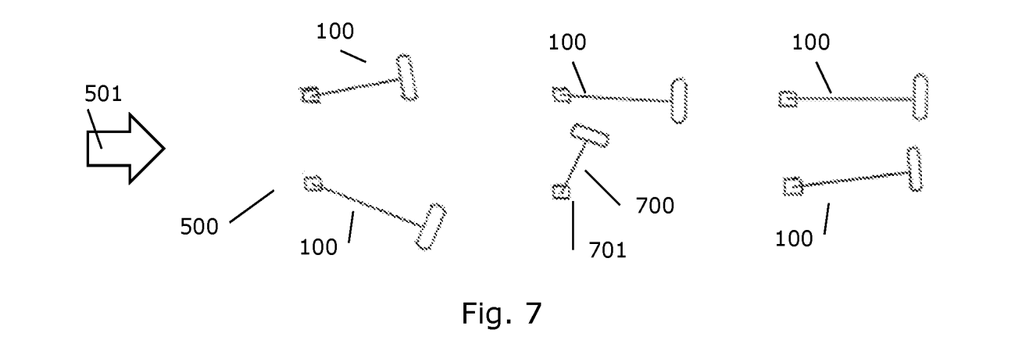

FIG. 7 illustrates a wind energy park 500 with a number of airborne wind energy systems 100. The wind engaging members 101 of each airborne wind energy systems 100 are generally in different positions in their respective flight trajectories, some of them in the power generation phase and others being retracted in their recovery phase. The average or mean positions of each wind engaging member 101 are indicated in the figure, further illustrating that the mean position of the wind engaging member 700 of the airborne wind energy systems 701 clearly deviates from the mean position of some or all of the other wind engaging members 101.

According to an embodiment of the invention an operational parameter of each of the number of airborne wind energy systems is determined and the operation parameter of a first airborne wind energy system is compared to the determined operational parameters of the others. If there is no significant difference, i.e. the deviation is smaller than a predetermined threshold parameter, the first airborne wind energy system is continued to be operated as normal, i.e. according to a normal control mode. However, if the deviation is larger than or equal to the predetermined threshold parameter, the operation of the first airborne wind energy system is changed and the first airborne wind energy system is operated according to a fault control mode.

Such faulty or deviating behaviour could as an example be due to wear on some of the components, a broken steering line, some malfunction in the control unit operating the steering lines or in the winch system, a tear or hole in the wind engaging member or the like.

By the comparison of operational parameters between the different airborne wind energy systems in the park, any abnormal or deviating behaviour of any one of the airborne wind energy systems may be identified earlier and with a higher certainty. Hereby appropriate can be taken earlier to restore the normal operation of the faulty airborne wind energy system potentially avoiding more serious errors or damage to the airborne wind energy system itself and prevent it from causing any damage to the other airborne wind energy systems in the park.

As illustrated in the embodiment illustrated in FIG. 7, the operational parameter may comprise the flight position of each of the flight engaging members. The flight position may be determined as a position of the kite (or glider) relative to its ground station and/or some other fixed point, and may be determined at one or more predefined heights or as a mean position over some time such as over the time of one flight cycle and/or some predefined time interval during a power generation phase.

The abnormal behaviour of the first airborne wind energy system may additionally or alternatively be determined by determining the deviation of one or more of the power production, the flight speed, a tension in the cable, a cable extraction and/or retraction speed, and/or an angle of the cable and comparing it to the same type of operational parameters determined on the other airborne wind energy systems in the energy park.

Figure 8:
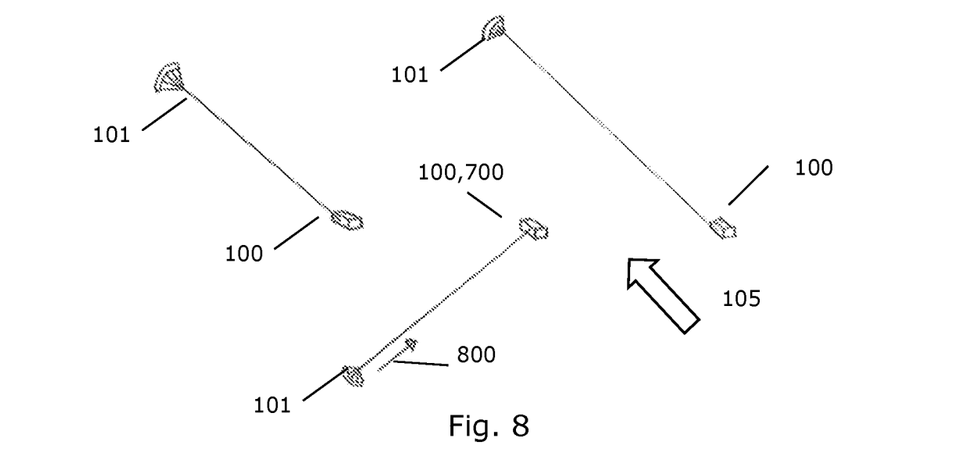
FIGS. 8-9 illustrate the operation of airborne wind energy systems in a wind energy park (as seen in a perspective view) and according to embodiments of the invention.
Figure 9:
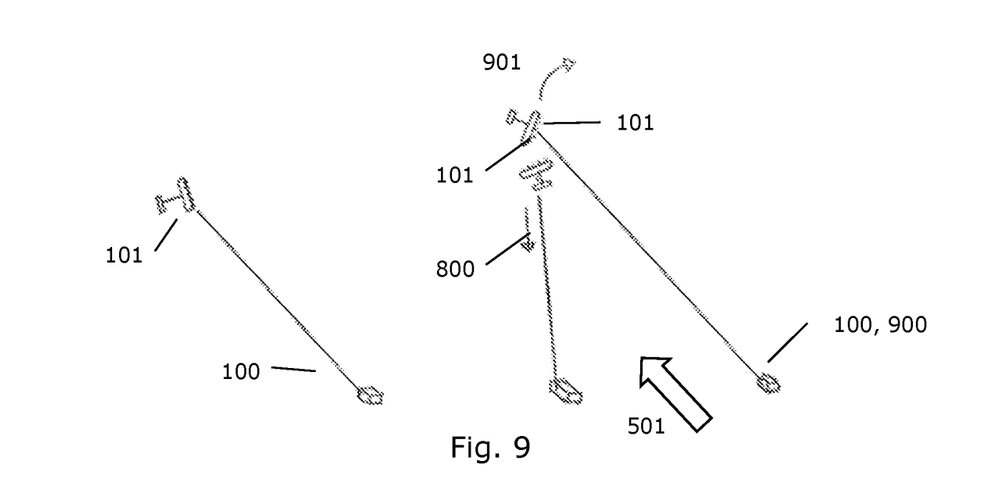

FIGS. 8 and 9 illustrate a method of controlling the airborne wind energy systems in a park according to an embodiment of the invention. The figures show three airborne wind energy systems in a wind energy park as seen in a perspective front view from the above a little upstream with respect to an overall direction of the wind 501. Here, the airborne wind energy system 700 has been determined to deviate in behaviour from the other airborne wind energy systems 100 and is therefore operated according to a fault control mode which here comprises retracting the wind engaging member of the faulty airborne wind energy system 700. This is indicated by the arrow 800.

In the situation illustrated in FIG. 9, the operation of the airborne wind energy system 900 neighbouring to the faulty airborne wind energy system 700 showing the deviating operational parameter, is furthermore changed from its normal operation mode and into being operated in a safe control mode. The safe control mode is primarily aimed to avoid any risk of collision between the two gliders and in order to clear the airspace for the faulty glider which is being retracted. The safe control mode her comprises steering the kite or glider 101 away from the faulty airborne wind energy system 700 as illustrated by the arrow 901. This may involve steering the wind engaging member 900 up to a higher height, in a sideway direction away from the faulty airborne wind energy system 700, and/or retracting this otherwise normal kite or glider to a lower height above the ground.

FIGS. 10-13 illustrate a wind energy park 500 comprising a number of airborne wind energy systems 100 of which a first airborne wind energy system 700 has been detected to be faulty for example by producing a power deviating significantly from the others, showing significantly higher or lower tension loads in the cable 105 or by a deviating flight trajectory to other airborne wind energy systems being operated similarly. The first airborne wind energy system 700 is therefore operated according a fault control mode which in this embodiment comprises releasing or cutting the cable 105 breaking the connection between the ground station 104 and the wind engaging member 101. The wind engaging member 101 of the faulty or deviating airborne wind energy system 700 is thereby allowed to fall, glide or to be steered to the ground.

Figure 10:
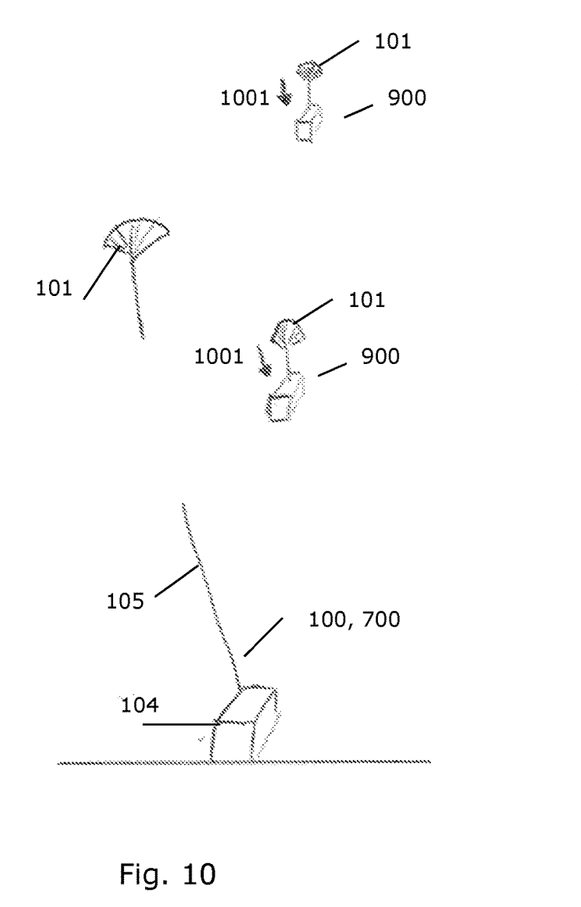
FIGS. 10-13 illustrate a method of controlling the airborne wind energy systems in a park according to embodiments of the invention.

In FIG. 10 showing a part of a wind energy park 500 in a front view, airborne wind energy systems 900 in a downwind direction to the first airborne wind energy system 700 with the released wind engaging member 101 are operated in a safe control mode comprising retracting their wind engaging members 101 as indicated by the arrows 1001. Preferably, the safe control mode of the airborne wind energy systems 900 is initiated before the fault control mode of the deviating first airborne wind energy system 700. In this way the airspace is cleared for the wind engaging member of the first airborne wind energy system 700 to be taken or guided down even if the wind engaging member drifts by the wind over a considerable distance.

Figure 12:
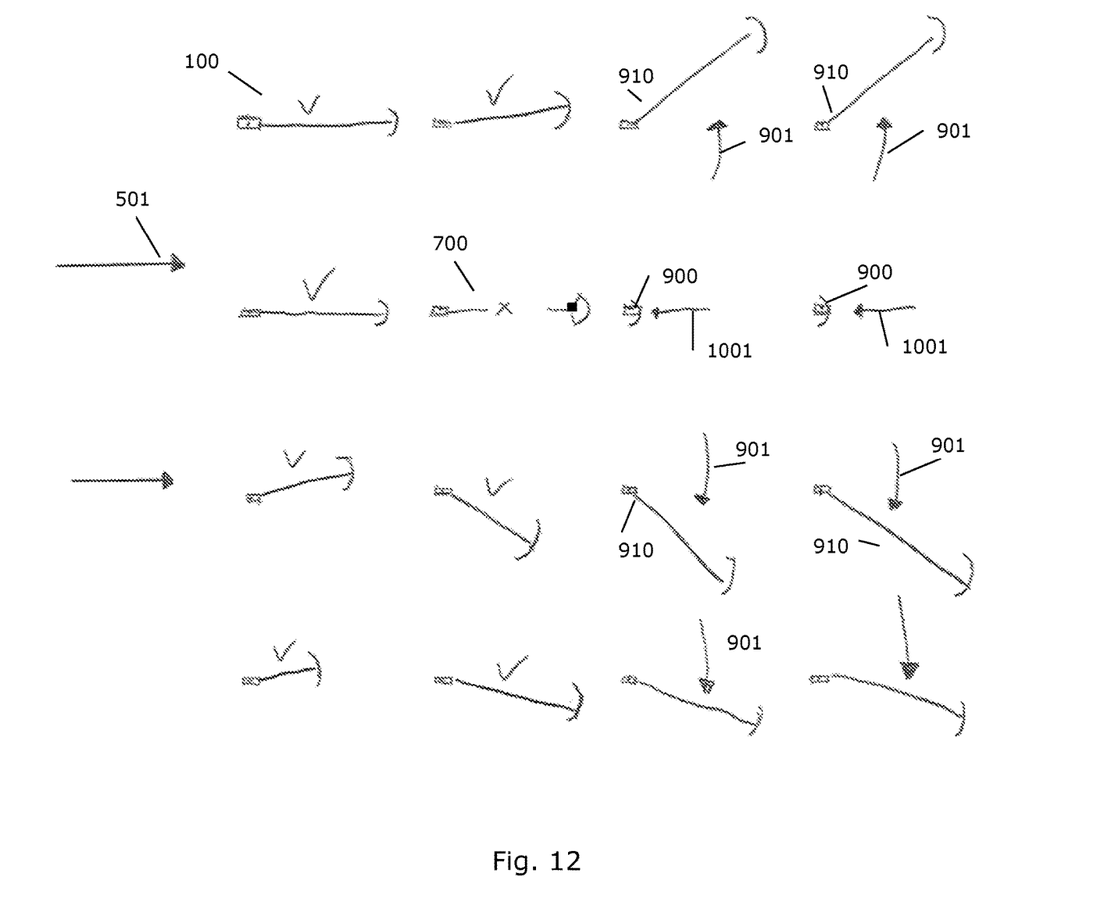

FIG. 12 illustrates more of the airborne wind energy systems 100 in the wind energy park 500 of FIG. 10 and as seen from above. The figure further shows how a belt or a clearance have been made for the wind engaging member of the first deviating airborne wind energy system 700 to fall down or drift down. As also shown in FIG. 10, some airborne wind energy systems 900 in the downwind direction 501 have been retracted 1001, and their neighbouring airborne wind energy systems 910 on both sides operated according a second safe control mode wherein their wind engaging members are steered in directions (illustrated by arrows 901) away from the crashing or landing path of the first airborne wind energy system 700. The airborne wind energy systems marked with 'v's are continued to be operated according to a normal control mode.

Figure 11:
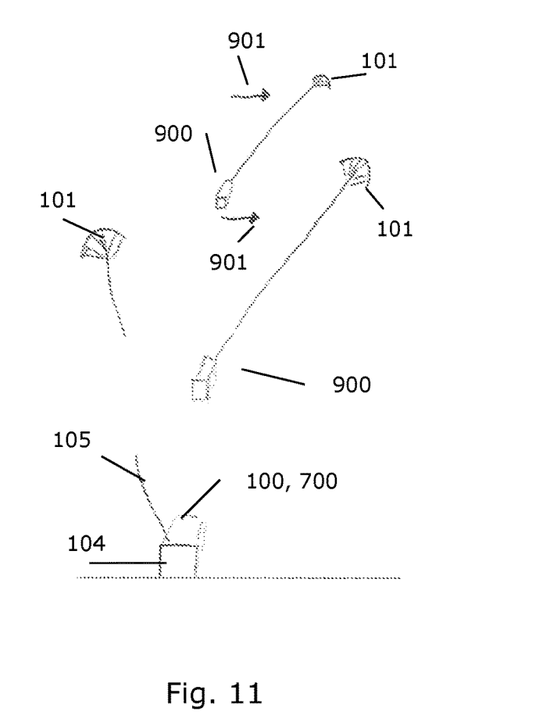
Figure 13:
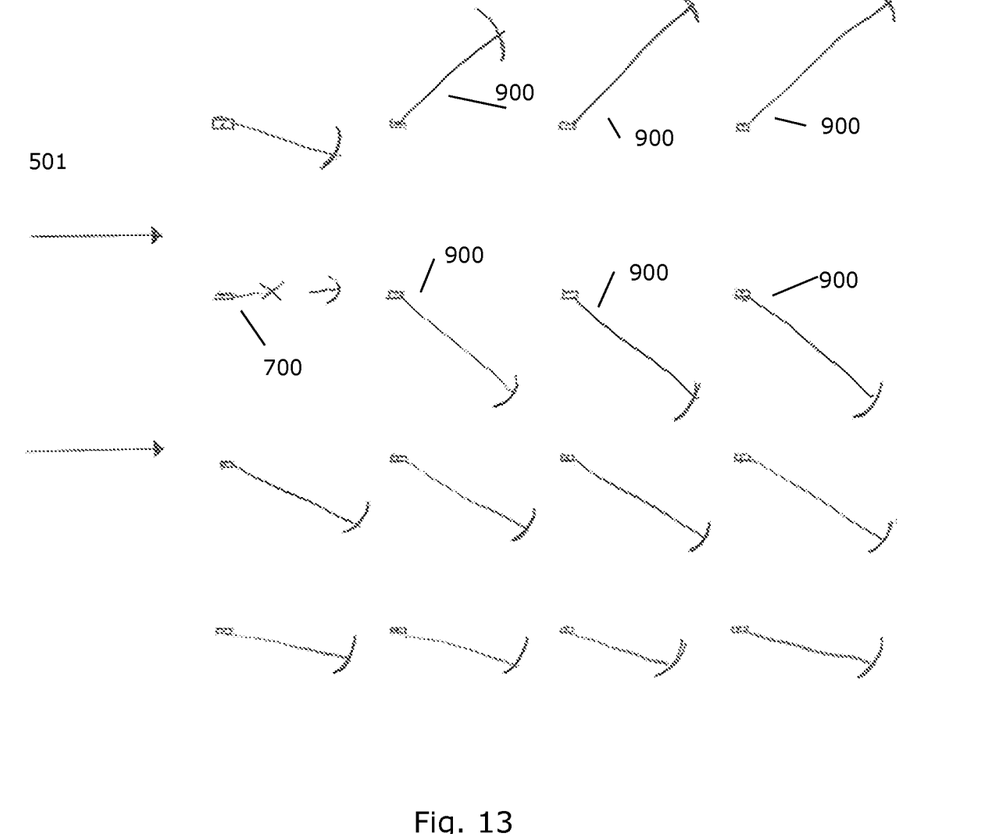

FIGS. 11 and 13 illustrate another embodiment of the invention. Here, the airborne wind energy systems 900 are operated according to a safe control mode comprising directing their wind engaging members 101 in directions 901 away from the downwind direction 501 of the first airborne wind energy system 700 with a deviating behaviour.

The invention claimed is:

1. A method for controlling the operation of a number of airborne wind energy systems arranged in a wind energy park, each airborne wind energy system comprising a wind engaging member being coupled to a ground station via a cable, the method comprising:

determining an operational parameter of each of the number of airborne wind energy systems, determining a deviation between the operational parameter of a first airborne wind energy system and the operational parameters of the other airborne wind energy systems, controlling the operation of the first airborne wind energy system according to a normal control mode if the deviation is smaller than a predetermined threshold parameter, controlling the operation of the first airborne wind energy system according to a fault control mode if the deviation is larger than or equal to the predetermined threshold parameter, and determining a wind direction and controlling the operation of one or more of the other airborne wind energy systems in a downwind direction to the first airborne wind energy system according to a safe control mode if the first airborne wind energy system is in a fault control mode.

2. The method according to claim 1, wherein the safe control mode is initiated prior to initiating the fault control mode.

3. The method according to claim 1, wherein the wind direction is determined from an angle of the cable.

4. The method according to claim 1, further comprising controlling the operation of all neighboring airborne wind energy systems to the first airborne wind energy system according to the safe control mode if the first airborne wind energy system is in a fault control mode.

5. The method according to claim 1, wherein the operational parameter comprises one of: power production, flight speed, a tension in the cable, a cable extraction and/or retraction speed, an angle of the cable, and flight position.

6. The method according to claim 1, wherein the operational parameter is determined without GPS signal.

7. The method according to claim 5, wherein at least one of the speed and the flight position is determined by determining a position of a point on the cable.

8. The method according to claim 7, wherein the point is at a connection between the cable and the first airborne wind energy system.

9. The method according to claim 1, wherein the operational parameter is determined over a predetermined time or time interval.

10. The method according to claim 1, wherein the fault control mode comprises retracting the wind engaging member to the ground station of the airborne wind energy system or to a lower height.

11. The method according to claim 1, wherein the fault control mode comprises releasing the wind engaging member from the cable between the wind engaging member and the ground station.

12. The method according to claim 11 wherein the fault control mode further comprises steering the wind engaging member to the ground.

13. The method according to claim 1, wherein the fault control mode comprises sending out warning and/or tracking signals from the wind engaging member, the warning and/or tracking signals comprising any of audio, visual, and radio signals.

14. The method according to claim 1, wherein the fault control mode includes sending a request for service.

15. The method according to claim 1, wherein the fault control mode comprises maintaining the wind engaging member at essentially the same height and operating the airborne wind energy system in a no-power production mode.

16. The method according to claim 1, wherein the safe control mode comprises retracting the wind engaging member to the ground station of the airborne wind energy system.

17. The method according to claim 1, wherein the safe control mode comprises steering the wind engaging member in a direction away from the wind engaging member of the first airborne wind energy system.

18. The method according to claim 1, wherein the safe control mode comprises steering the wind engaging member to a height above the height of the wind engaging member of the first airborne wind energy system.

* * * * *